(12) United States Patent
Park et al.

(10) Patent No.: US 7,425,388 B2
(45) Date of Patent: *Sep. 16, 2008

(54) ELECTROLYTE FOR A LITHIUM BATTERY AND A LITHIUM BATTERY COMPRISING THE SAME

(75) Inventors: Yong-Chul Park, Suwon (KR); Won-Il Jung, Seongnam (KR); Geun-Bae Kim, Suwon (KR); Jae-Phil Cho, Suwon (KR); Cheol-Soo Jung, Ohsan (KR)

(73) Assignee: Samsung SDI Co., Ltd., Suwon-si (KR)

( * ) Notice: Subject to any disclaimer, the term of this patent is extended or adjusted under 35 U.S.C. 154(b) by 735 days.

This patent is subject to a terminal disclaimer.

(21) Appl. No.: 10/656,086

(22) Filed: Sep. 5, 2003

(65) Prior Publication Data

US 2004/0048163 A1    Mar. 11, 2004

(30) Foreign Application Priority Data

Sep. 6, 2002    (KR) .................... 10-2002-0053879

(51) Int. Cl.
    H01M 6/16    (2006.01)
(52) U.S. Cl. .................. 429/340; 429/326; 429/307; 429/327; 429/330; 429/336; 429/341; 429/339
(58) Field of Classification Search ................ 429/307, 429/326, 327, 330, 340, 336, 341, 339
    See application file for complete search history.

(56) References Cited

U.S. PATENT DOCUMENTS

| | | | |
|---|---|---|---|
| 5,290,414 A | 3/1994 | Marple | |
| 5,580,680 A * | 12/1996 | Chaloner-Gill et al. | ..... 429/305 |
| 5,709,968 A | 1/1998 | Shimizu | |
| 5,879,834 A | 3/1999 | Mao | |
| 6,146,790 A | 11/2000 | Omaru et al. | |
| 6,194,099 B1 | 2/2001 | Gernov et al. | |
| 6,245,465 B1 | 6/2001 | Angell et al. | |
| 6,670,078 B1 | 12/2003 | Sato et al. | |
| 7,105,250 B2 * | 9/2006 | Kim et al. | ..... 429/327 |
| 7,205,073 B2 * | 4/2007 | Kim et al. | ..... 429/307 |
| 7,223,500 B2 * | 5/2007 | Noh et al. | ..... 429/307 |
| 2001/0009744 A1 * | 7/2001 | Kim et al. | ..... 429/326 |
| 2003/0148190 A1 | 8/2003 | Hamamoto et al. | |
| 2003/0157411 A1 * | 8/2003 | Jung et al. | ..... 429/307 |
| 2003/0190529 A1 * | 10/2003 | Kim et al. | ..... 429/307 |
| 2004/0029018 A1 * | 2/2004 | Kim et al. | ..... 429/326 |

FOREIGN PATENT DOCUMENTS

| | | |
|---|---|---|
| EP | 1 030 399 A1 | 8/2000 |
| JP | 3-152879 | 6/1991 |
| JP | 5-307974 | 11/1993 |
| JP | 06-333596 | 12/1994 |
| JP | 07-176323 | 7/1995 |
| JP | 7-230824 | 8/1995 |
| JP | 07-320779 | 12/1995 |
| JP | 08-064238 | 3/1996 |
| JP | 08-321312 | 12/1996 |
| JP | 09-73918 | 3/1997 |
| JP | 9-147913 | 6/1997 |
| JP | 9-199170 | 7/1997 |
| JP | 9-205041 | 8/1997 |
| JP | 10-189044 | 7/1998 |
| JP | 11-162511 | 6/1999 |
| JP | 11-214001 | 8/1999 |
| JP | 11-329494 | 11/1999 |
| JP | 11-329496 | 11/1999 |
| JP | 2000-106209 | 4/2000 |
| JP | 2000-133305 | 5/2000 |
| JP | 2000-294278 | 10/2000 |
| JP | 2000-348763 | 12/2000 |
| JP | 2001-23688 | 1/2001 |
| JP | 2001-57234 | 2/2001 |
| JP | 2001-223024 | 8/2001 |
| JP | 2002-8720 | 1/2002 |
| KR | 2000-2947 | 9/2001 |
| KR | 2000-81253 | 9/2001 |
| WO | WO 99/16144 | 1/1999 |
| WO | WO 99/19932 | 4/1999 |
| WO | WO 99/28987 * | 6/1999 |

OTHER PUBLICATIONS

Patent Abstracts of Japan; Publication No. 2000-133305; Publication Date: Dec. 5, 2000; in the name of Hamamoto, et al.
Patent Abstracts Of Japan, Publication No. 06-333596; Publication Date: Dec. 2, 1994; in the name of Yamazaki et al.
Patent Abstracts Of Japan, Publication No. 07-320779; Publication Date: Dec. 8, 1995; in the name of Yamazaki et al.
Patent Abstracts Of Japan, Publication No. 07-176323; Publication Date: Jul. 14, 1995; in the name of Kubota.
Patent Abstracts Of Japan, Publication No. 08-064238; Publication Date: Mar. 8, 1996; in the name of Uehara et al.
Patent Abstracts Of Japan, Publication No. 08-321312; Publication Date: Dec. 3, 1996; in the name of Jinno et al.
Patent Abstracts Of Japan, Publication No. 09-073918; Publication Date: Mar. 18, 1997; in the name of Ogawa et al.
Patent Abstracts of Japan, Publication No. 2000-106209; Publication date Apr. 11, 2000; in the name of Hayashi et al.
Patent Abstracts of Japan, Publication No. 11-329496; Publication date Nov. 30, 1999; in the name of Hayashi et al.

(Continued)

Primary Examiner—Laura S Weiner
(74) Attorney, Agent, or Firm—Christie, Parker & Hale, LL (57) ABSTRACT

An electrolyte for a lithium battery includes a non-aqueous organic solvent, a lithium salt, and an additive comprising a) a sulfone-based compound and b) a $C_3$ to $C_{30}$ organic peroxide or azo-based compound. The electrolyte may further include a poly(ester)(meth)acrylate or a polymer that is derived from a (polyester)polyol with at least three hydroxyl (—OH) groups, where a portion or all of the hydroxyl groups are substituted with a (meth)acrylic ester and the remaining hydroxyl groups that are not substituted with the (meth)acrylic ester are substituted with a group having no radical reactivity. The lithium battery comprising the electrolyte of the present invention has a significantly improved charge-discharge and cycle life characteristics, recovery capacity ratio at high temperature, and swelling inhibition properties.

15 Claims, 2 Drawing Sheets

OTHER PUBLICATIONS

Patent Abstracts of Japan, Publication No. 2001-223024; Publication date Aug. 17, 2001; in the name of Kin et al.

Patent Abstracts of Japan, Publication No. 10-189044; Publication date Jul. 21, 1998; in the name of Komaru et al.

Megahed et al., "Lithium-ion rechargable batteries," *Journal of Power Sources* (1994) pp. 79-104, vol. 51.

Yang, et al., "Composition analysis of the passive film on the carbon electrode of a lithium-ion battery with an EC-based electrolyte," *Journal of Power Sources* (1998), pp. 66-70, vol. 72.

Patent Abstracts of Japan, Publication No. 03-152879; Date of Publication: Jun. 28, 2001; in the name of Hiroshi Watanabe et al.

Patent Abstracts of Japan and Patent Application of Japan, Publication No. 05-307974; Date of Publication: Nov. 19, 2003; in the name of Hiroaki Yoshida.

Patent Abstracts of Japan, Publication No. 07-230824; Date of Publication: Aug. 29, 1995; in the name of Hiroaki Yoshida.

Patent Abstracts of Japan, Publication No. 09-147913; Date of Publication: Jun. 6, 1997; in the name of Maruo Jinno, et al.

Patent Abstracts of Japan, Publication No. 09-205041; Date of Publication: Aug. 5, 1997; in the name of Kazufumi Nishida, et al.

Patent Abstracts of Japan, Publication No. 11-214001; Date of Publication: Aug. 6, 1999; in the name of Takashi Suzuki, et al.

Patent Abstracts of Japan and Patent Application of Japan, Publication No. 11-329494; Date of Publication: Nov. 30, 1999; in the name of Shunichi Hamamoto, et al.

Patent Abstracts of Japan, Publication No. 2000-348763; Date of Publication: Dec. 15, 2000; in the name of Emi Suzuki, et al.

Patent Abstracts of Japan, Publication No. 09-199170, dated Jul. 31, 1997, in the name of Hiro yoshi Yoshihisa et al.

Patent Abstracts of Japan, Publication No. 2002-008720, dated Jan. 11, 2002, in the name of Takao Nirasawa et al.

Patent Abstracts of Japan, Publication No. 11-162511, dated Jun. 18, 1999, in the name of Shoichiro Mori et al.

Patent Abstracts of Japan, Publication No. 12000-294278, dated Oct. 20, 2000, in the name of Akio Hibara et al.

Patent Abstracts of Japan, Publication No. 2001-023688, dated Jan. 26, 2001, in the name of Shunichi Hamamoto et al.

Patent Abstracts of Japan, Publication No. 2001-057234, dated Feb. 27, 2001, in the name of Akio Hibara.

* cited by examiner

ELECTROLYTE FOR A LITHIUM BATTERY AND A LITHIUM BATTERY COMPRISING THE SAME

CROSS REFERENCE TO RELATED APPLICATION

This application claims priority of Korean patent application No. 2002-53879 filed in the Korean Intellectual Property Office on Sep. 6, 2002, the disclosure of which is incorporated herein by reference.

FIELD OF THE INVENTION

The present invention relates to an electrolyte for a lithium battery and a lithium battery comprising the same, and more particularly, to an electrolyte for a lithium battery to improve charge-discharge, cycle life, capacity recovery at high temperature, and swelling inhibition, and a lithium battery comprising the same.

BACKGROUND OF THE INVENTION

The use of portable electronic instruments is increasing as electronic equipment gets smaller and lighter due to developments in the high-tech electronic industry. Studies of lithium secondary batteries are actively being pursued in accordance with the increased need for a battery having high energy density for use as a power source in these portable electronic instruments. Such a lithium secondary battery, having an average discharge potential of 3.7 V (i.e., a battery having substantially a 4 V average discharge potential), is considered to be an essential element in the digital generation since it is an indispensable energy source for portable digital devices such as cellular telephones, notebook computers, camcorders, also known as the "3C" devices.

A lithium secondary battery produces electric energy from a change of chemical potential of active materials during intercalation/deintercalation reactions of lithium ions at negative and positive electrodes.

Lithium secondary batteries use materials that reversibly intercalate or deintercalate lithium ions during charge and discharge reactions as both positive and negative active materials, and they include a liquid or polymer electrolyte between the negative and positive electrodes. Exemplary positive active materials include lithium metal oxide, and exemplary negative active materials include lithium metals, lithium-containing alloys, crystalline or amorphous carbons, and carbon-containing composites.

The choice of suitable electrolytes is one of the factors for improving cell characteristics, because reactions between electrodes and the electrolyte have an effect on cell performance. To improve low temperature characteristics, a lithium secondary battery using a liquid electrolyte uses an organic solvent with a low boiling point that induces swelling of a prismatic or pouch battery during high temperature storage. As a result, the reliability and safety of the battery deteriorate at a high temperature.

For solving the internal pressure problem, there is disclosed a method in which the safety of a secondary battery including a non-aqueous electrolyte is improved by mounting a vent or a current breaker for ejecting internal electrolyte solution when the internal pressure is increased above a certain level. However, a problem with this method is that misoperation may result from an increase in internal pressure itself.

Furthermore, a method in which the SEI-forming reaction is changed by injecting additives into an electrolyte so as to inhibit the increase in internal pressure is known. For example, Japanese Patent Laid-open No. 97-73918 discloses a method in which high temperature storage characteristics of a battery are improved by adding 1% or less of a diphenyl picrylhydrazyl compound to the electrolyte. Japanese Patent Laid-open No. 96-321312 discloses a method in which cycle life and long-term storage characteristics are improved using 1 to 20% of an N-butyl amine based compound in an electrolyte. Japanese Patent Laid-open No. 96-64238 discloses a method in which storage characteristics of a battery are improved by adding $3 \times 10^{-4}$ to $3 \times 10^{-3}$ M of calcium salt to the electrolyte. Japanese Patent Laid-open No. 94-333596 discloses a method in which storage characteristics of a battery are improved by adding an azo-based compound to inhibit the reaction between the electrolyte and the negative electrode of the battery. In addition, Japanese Patent Laid-open No. 95-176323 discloses a method in which $CO_2$ is added to an electrolyte, and Japanese Patent Laid-open No. 95-320779 discloses a method in which sulfide-based compounds are added to an electrolyte in order to prevent the electrolyte from decomposing.

Such methods as described above for inducing the formation of an appropriate film on a negative electrode surface such as an organic SEI film by adding a small amount of organic or inorganic materials in order to improve the storage characteristics and safety of a battery. However, there are various problems with these methods. For example, the added compound decomposes or forms an unstable film by interacting with the carbon negative electrode during the initial charge and discharge due to inherent electrochemical characteristics, resulting in the deterioration of the ion mobility in electrons. Also, gas is generated inside the battery such that there is an increase in internal pressure, resulting in significant deterioration of the storage, safety, cycle life, and capacity characteristics of the battery.

In order to inhibit swelling that is induced from use of liquid electrolyte, it is suggested to use a polymer solid electrolyte. The polymer solid electrolyte leaks less than liquid electrolyte, resulting in improvement of battery safety.

However, the polymer solid electrolyte has a lower ionic conductivity than a liquid electrolyte. A linear polymer or cross-linked polymer of a homopolymer or copolymer having ethylene oxide as a base unit has been used as a monomer of an ionic conductive polymer for forming a polymer solid electrolyte. The polymer derived from such a monomer is likely to crystallize, however, and thus has poor properties at low temperatures. Therefore, the polymer solid electrolyte has a limit for inhibition of battery swelling.

SUMMARY OF THE INVENTION

The present invention provides an electrolyte for a lithium battery, wherein the electrolyte includes a non-aqueous organic solvent, a lithium salt, and an additive comprising a) a sulfone-based compound; and b) a $C_3$ to $C_{30}$ organic peroxide or azo-based compound.

The present invention further provides an electrolyte for a lithium battery, wherein the electrolyte includes a non-aqueous organic solvent, a lithium salt, and an additive comprising a) a sulfone-based compound; b) a $C_3$ to $C_{30}$ organic peroxide or azo-based compound; and c) a poly(ester)(meth)acrylate or a polymer thereof which is a polymer derived from a (polyester)polyol with at least three hydroxyl (—OH) groups where a portion or all of the hydroxyl groups are substituted with a (meth)acrylic ester, and any remaining hydroxyl groups that are not substituted with the (meth)acrylic ester are substituted with a group having no radical reactivity.

The present invention further provides a lithium battery including the electrolyte.

The electrolyte of the invention has been found to improve charge-discharge characteristics, cycle life, capacity recovery rate at high temperature, and swelling inhibition properties of the battery.

Other features and/or advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention, and together with the description, serve to explain the principles of the invention.

DETAILED DESCRIPTION OF THE PREFERRED EMBODIMENTS

In the following detailed description, the following embodiments of the invention have been shown and described, simply by way of illustration of the best mode contemplated by the inventors of carrying out the invention. As will be realized, the invention is capable of modification in various respects, all without departing from the invention. Accordingly, the drawings and description are to be regarded as illustrative in nature, and not restrictive.

Figure 1:
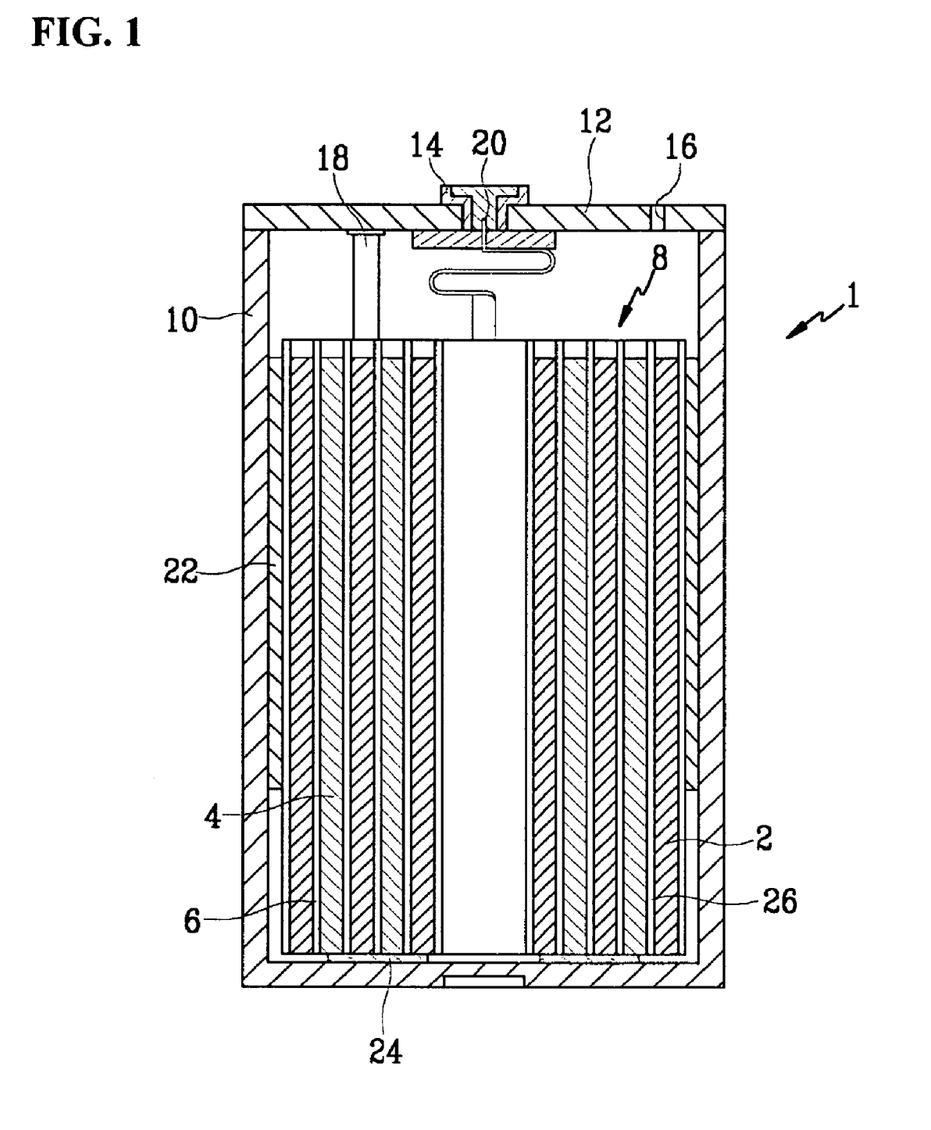
FIG. 1 is a cross-sectional view of a lithium secondary battery cell.

A cross-sectional view of a general non-aqueous Li-ion cell is shown in FIG. 1. The Li-ion cell 1 is fabricated by inserting an electrode assembly 8 including a positive electrode 2 and a negative electrode 4 with a separator 6 therebetween, into a battery case 10. An electrolyte 26 is injected into the battery case 10 and impregnated into the separator 6. The upper part of the case 10 is sealed with a cap plate 12 and a sealing gasket 14, and the cap plate 12 has a safety vent 16 to release pressure. A positive electrode tab 18 and a negative electrode tab 20 are respectively attached on the positive electrode 2 and negative electrode 4. Insulators 22 and 24 are installed on the lower part and the side part of the electrode assembly 8 to prevent a short circuit occurrence in the battery.

According to a first aspect of the present invention, an electrolyte for a lithium battery that improves capacity recovery at high temperature and swelling inhibition properties is provided, which includes a non-aqueous organic solvent, a lithium salt, and an additive comprising a) a sulfone-based compound; and b) a $C_3$ to $C_{30}$ organic peroxide or azo-based compound.

The sulfone-based compound inhibits swelling and is represented by one of the following Formulas (1) to (3):

(1)

where $R^1$ and $R^2$ are independently selected from the group consisting of a primary alkyl group, a secondary alkyl group, a tertiary alkyl group, an alkenyl group, and an aryl group, and preferably a $C_1$ to $C_4$ alkyl, a $C_2$ to $C_4$ alkenyl, or a $C_6$ to $C_{14}$ aryl group;

(2)

where p ranges is from 0 to 3; and

(3)

Specific examples of a sulfone-based compound include vinyl sulfone, methyl sulfone, phenyl sulfone, benzyl sulfone, tetramethylene sulfone, and butadiene sulfone.

A sulfone-based compound is added to a non-aqueous solvent in an amount of 0.001 to 10 wt %, preferably 0.1 to 5 wt %, more preferably 0.3 to 1.5 wt % of the total amount of the electrolyte.

The addition effect of the compound is not sufficiently realized when the sulfone-based compound is used in an amount of less than 0.001 wt %, and the capacity characteristics of the battery decrease when the sulfone-based compound is used in an amount exceeding 10 wt %.

Examples of the organic peroxide include isobutyl peroxide, lauryl peroxide, lauroyl peroxide, benzoyl peroxide, m-toluoyl peroxide, t-butylperoxy-2-ethyl hexanoate, t-butyl peroxy bibarate, t-butyloxyneodecanate, diisopropyl peroxy dicarbonate, diethoxy peroxy dicarbonate, bis-(4-t-butylcyclohexyl)peroxy dicarbonate, dimethoxy isopropyl peroxy dicarbonate, dicyclohexylperoxy dicarbonate, 3,3,5-trimethylhexanoyl peroxide, dialkyl peroxide and the like. Benzoyl peroxide and lauroyl peroxide are preferred. The lauroyl peroxide is represented by the following Formula (4):

A specific example of an azo-based compound is 2,2'-azobisisobutyronitrile.

The initial charge-discharge efficiency of a lithium battery is related to the coating layer formed on the surface of electrodes, particularly the negative electrode. The coating layer determines most of the battery performance, for example, the initial charge-discharge efficiency. When effective initial charge-discharge is realized, the surface of the negative electrode in a charge state is uniform. However, when ineffective initial charge-discharge is realized, a large amount of lithium is deposited on the surface of the negative electrode.

The organic peroxide or azo-based compound acts as a surfactant between the electrolyte and the negative electrode, particularly a carbonaceous negative electrode, to reduce resistance at the surface of the negative electrode resulting in inhibition of electrolyte decomposition at the surface of the negative electrode. When lauroyl peroxide is used as a polymerization initiator, the coating layer on the negative electrode is a lithium carbonate layer, which is produced by the following scheme 1:

As shown in the above scheme 1, lauroyl peroxide decomposes to generate $CO_2$ gas, and then the $CO_2$ gas forms a lithium carbonate ($Li_2CO_3$) coating layer on the negative electrode. Such a coating layer inhibits decomposition of the electrolyte on the negative electrode during initial charge, and therefore it is not necessary to remove the gas generated from the decomposition of the electrolyte thereafter. If the coating layer is stably formed on the negative electrode, decomposition of the electrolyte is inhibited after the charge/discharge cycle is repeated, and the electrode is very stable, preventing swelling of the battery during storage at an elevated temperature.

The organic peroxide has a —C(=O)—O—O—C(=O)— polar (hydrophilic) region and a $C_3$ to $C_{30}$ nonpolar (hydrophobic) region, preferably a $C_3$ to $C_{20}$ aliphatic or $C_6$ to $C_{30}$, and more preferably a $C_6$ to $C_{20}$, aromatic hydrocarbon. The inhibition effect of the electrolyte decomposition is not realized sufficiently when the carbon number is less than 3, and the balance between polarity and nonpolarity is broken and nonpolarity increases excessively so that it is difficult to dissolved it in electrolyte when the carbon number is more than 30.

The organic peroxide or azo-based compound is added to a non-aqueous solvent in an amount of 0.001 to 10 wt % of the total amount of the electrolyte. Initial capacity and high rate characteristics deteriorate when the organic peroxide or azo-based compound is used in an amount of less than 0.001 wt %, and the cycle life characteristics of the battery decrease when the sulfone-based compound is used in an amount exceeding 10 wt %.

According to a second aspect of the present invention, an electrolyte for a lithium battery is provided that improves capacity recovery at high temperatures and swelling inhibition properties and which includes a non-aqueous organic solvent, a lithium salt, and an additive comprising a) a sulfone-based compound; b) a $C_3$ to $C_{30}$ organic peroxide or azo-based compound; and c) poly(ester)(meth)acrylate or a polymer thereof.

The sulfone-based compound and organic peroxide are the same as in the first aspect described above. The poly(ester)(meth)acrylate is a polymer derived from a (polyester)polyol with at least three hydroxyl (—OH) groups where a portion or all of the hydroxyl groups are substituted with a (meth)acrylic ester, and the remaining hydroxyl groups that are not substituted with the (meth)acrylic ester are substituted with a group having no radical reactivity.

The electrolyte of the second aspect of the present invention can inhibit swelling of the battery resulting from gas generation at an elevated temperature, since the organic peroxide or azo-based compound acts as a polymerization initiator and the poly(ester)(meth)acrylate is polymerized when the temperature of the battery increases. The poly(ester)(meth)acrylate or polymer thereof can be polymerized to form a gel polymer electrolyte by subjecting the battery to heat in the range of 40 to 110° C., or to UV radiation immediately after fabrication. The gel polymer electrolyte can optimize the retention of electrolyte, and it does not inhibit mobility of lithium ions, resulting in establishment of effective battery performance.

The poly(ester)(meth)acrylate and polymer thereof inhibit swelling of the battery and improve cycle life characteristics. The poly(ester)(meth)acrylate is obtained from a (polyester)polyol with at least three hydroxyl groups. A poly(ester)(meth)acrylate obtained from a (polyester)polyol with less than three hydroxyl groups forms a dense and sticky electrolyte to decrease the mobility of the lithium ions. This decrease of lithium ion mobility deteriorates battery performance at a high rate, and low temperature performance, and decreases the cycle life characteristics.

When a poly(ester)(meth)acrylate prepared by substituting all of the hydroxyl groups of the (polyester)polyol with a (meth)acrylic ester is used as a monomer for forming a gel polymer, structural steric hindrance occurs during the gelation reaction to form the polymer electrolyte, and therefore, an unreacted acrylate group remains in the resultant polymer electrolyte. The unreacted acrylate group has very strong reactivity, which deteriorates high rate performance and low temperature characteristics.

When a poly(ester)(meth)acrylate prepared by substituting all of the hydroxyl groups of the (polyester)polyol with a (meth)acrylic ester is used as the electrolytic additive, structural steric hindrance occurs during the gelation reaction to form the polymer electrolyte, and therefore, an unreacted acrylate group remains in the resultant polymer electrolyte. The unreacted acrylate group has very strong reactivity, which deteriorates high rate performance or low temperature characteristics.

For a polymer electrolyte, it is preferable to use a poly(ester)(meth)acrylate derived from a (polyester)polyol with at least three hydroxyl (—OH) groups, where some of the hydroxyl groups are substituted with a (meth)acrylic ester, and the remaining hydroxyl groups that are not substituted with the (meth)acrylic ester are substituted with a group having no radical reactivity.

As the (polyester)polyol, any (polyester)polyol with at least three hydroxyl groups may be used, regardless of the synthesis method, and these may be available commercially. Specific examples of the (polyester)polyol are trialkylols such as trimethylol, triethylol, and tripropylol; various glycerols; and erythritols, such as pentaerythritol, dipentaerythritol, and the like.

The substitution of the hydroxyl group of the (polyester)polyol with the (meth)acrylic ester can be performed using general esterification.

In general esterification, there is a condensation reaction wherein a (polyester)polyol and a (meth)acrylic acid or a derivative thereof (for example, a halogenized (meth)acrylic acid) is reacted under a base catalyst, and a condensation reaction wherein a (polyester)polyol and (meth)acrylic acid, or a derivative thereof (for example, a halogenized (meth)acrylic acid), is reacted under an acid catalyst, etc. However, other methods of synthesizing a poly(ester)(meth)acrylate from a (polyester)polyol and (meth)acrylic acid or a derivative thereof can be used.

The amount of the (meth)acrylic acid or derivative thereof is varied according to the number of moles of the hydroxyl group of the (polyester)polyol, and it is preferable to use about 1 mole of (meth)acrylic acid or a derivative thereof per 1 mole of (polyester)polyol. In a preferred embodiment, 0.1 to 10 moles of (meth)acrylic acid or a derivative thereof is used on the basis of 1 mole of (polyester)polyol.

The poly(ester)(meth)acrylate or polymer thereof prepared by the esterification can improve performance of a polymer electrolyte by controlling the functionality of the terminal group. The functionality of the terminal group is determined by the ratio of (meth)acrylic acid or derivative thereof which substitutes the terminal group with an acrylate group, and a carbonyl or halogen compound which substitutes the terminal group with a group having no radical reactivity. The carbonyl or halogen compound comprises a $C_1$ to $C_{20}$ aliphatic hydrocarbon, a $C_5$ to $C_{20}$ aromatic hydrocarbon, a $C_1$ to $C_{20}$ ether, or a $C_1$ to $C_{20}$ ester. For example, (meth)acrylic acid or a derivative thereof and a carbonyl or halogen compound is preferably used in a mole ratio of 1:0 to 1:10. When the ratio is 1:0, a poly(ester)(meth)acrylate wherein all hydroxyl groups of (polyester)polyol are substituted with acrylate groups is prepared. When the ratio is beyond 1:10, the acrylate group for the cross-linking reaction is too limited to form an appropriate polymer electrolyte.

A base catalyst used for the esterification reaction can be an organic salt such as triethylamine, pyridine, dimethylaminepyridine, and the like, or an inorganic salt such as lithium carbonate, potassium carbonate, lithium hydroxide, sodium hydroxide, and the like. The base catalyst is used in an amount of 0.0001 to 0.01 parts by weight per 1 part by weight of the total reaction material. An acid catalyst used for the esterification reaction can be (meth)acrylic acid, sulfuric acid, hydrochloric acid, phosphoric acid, or the like.

The (polyester)polyol may be modified by ring-opening polymerization with a lactone before the esterification. The ring-opening polymerization with the lactone makes the hydroxyl group length controllable, and modifies the resulting polymer electrolyte.

Specific examples of the lactone are ε-caprolactone and γ-caprolactone. Lactone can be used in any ratio relative to the total number of hydroxyl groups, and the amount of lactone is not particularly limited. In one preferred example, lactone is used in an amount less than 10 moles, more preferably 0.01 to 10 moles per 1 mole of the total hydroxyl groups of (polyester)polyol, considering the solubility and molecular size of the substituted (polyester)polyol.

In order to facilitate ring-opening polymerization, a catalyst such as an organic titanium-based compound, an organic tin-based compound, or a metal salt of organic carbonic acid is used. The titanium-based compound includes tetrapropylititanate.

The amount of the catalyst is 0.001 to 0.5 parts by weight on the basis of 1 part by weight of the lactone compound. When the amount of catalyst is out of this range, it is not preferred for reactivity of ring-opening polymerization.

The ring-opening polymerization can be carried out in either the presence or absence of an organic solvent. The organic solvent can be an aromatic compound, a saturated hydrocarbon compound or the like. The organic solvent is used in an amount of 1 to 50 parts by weight, and preferably 2 to 10 parts by weight, per 1 part by weight of (polyester)polyol.

Through the esterification as described above, a poly(ester)(meth)acrylate or a polymer thereof, wherein a portion or all of the at least three hydroxyl groups of the (polyester)polyol are substituted with a (meth)acrylic ester, and the remaining hydroxyl groups that are not substituted with the (meth)acrylic ester are substituted with a group having no radical reactivity, is obtained.

The (meth)acrylic ester is represented by —OC(=O)(CH$_2$)$_n$OC(=O)CH=CH$_2$ or —OC(=O)(CH$_2$)$_n$OC(=O)C(CH$_3$)=CH$_2$, where n is an integer of 1 to 20, preferably 1 to 6.

The group having no radical reactivity is a $C_1$ to $C_{20}$ aliphatic hydrocarbon, a $C_5$ to $C_{20}$ aromatic hydrocarbon, a $C_1$ to $C_{20}$ ether, or a $C_1$ to $C_{20}$ ester, and preferably —OC(=O)(CH$_2$)$_3$CH$_3$, —OC(=O)Ar (wherein Ar is an unsubstituted or substituted aromatic hydrocarbon), —OC(=O)(CH$_2$)$_n$O(CH$_2$)$_n$CH$_3$, where n is an integer ranging from 1 to 20, —O(C=O)(CH$_2$)$_n$OC(=O)(CH$_2$)$_n$CH$_3$, where n is an integer ranging from 1 to 20, or —(C=O)CH=CH$_2$.

For example, a (meth)acrylic acid or a derivative thereof and the group having no radical reactivity are preferably used in a mole ratio of 1:0.01 to 1:100, more preferably 1:0.5 to 1:3.

The poly(ester)(meth)acrylate or polymer thereof preferably has a weight average molecular weight in the range of 300 to 100,000, and more preferably 100 to 10,000. The poly(ester)(meth)acrylate or polymer thereof is present in a liquid state, and it inhibits gas generation inside the battery. The poly(ester)(meth)acrylate or polymer thereof is also a monomer to form a gel when being used along with a polymerization initiator.

A preferable poly(ester)(meth)acrylate or polymer thereof is represented by the Formula (5):

The poly(ester)(meth)acrylate or polymer thereof is preferably used in an amount of 0.001 to 30 wt % of the total electrolyte. When the amount is less than 0.001 wt %, the addition effect is not sufficient, and when the amount is more than 30 wt %, cycle life characteristics deteriorate.

The electrolyte additive, as described above, is added to a non-aqueous organic solvent including a lithium salt. The lithium salt acts as a source of lithium ions in the battery, making the basic operation of the lithium battery possible. The non-aqueous organic solvent plays the role of a medium wherein ions capable of participating in the electrochemical reaction are mobilized.

The lithium salt is preferably at least one selected from the group consisting of $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiSbF_6$, $LiAlO_4$, $LiAlCl_4$, $LiN(C_xF_{2x+1}SO_2)(C_yF_{2y+1}SO_2)$ (wherein x and y are natural numbers), LiCl, and LiI.

The concentration of the lithium salt preferably ranges from 0.6 to 2.0 M, more preferably 0.7 to 1.6 M. When the concentration of the lithium salt is less than 0.6 M, the electrolyte performance deteriorates due to its ionic conductivity. When the concentration of the lithium salt is greater than 2.0 M, the lithium ion mobility decreases due to an increase of the electrolyte viscosity.

The non-aqueous organic solvent may comprise a carbonate, an ester, an ether, or a ketone. Examples of carbonates include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), and butylene carbonate (BC). Examples of esters include butyrolactone (BL), n-methyl acetate, n-ethyl acetate, n-pro- pyl acetate, decanolide, valerolactone, mevalonolactone, caprolactone and the like. An example of an ether is dibutyl ether, and an example of a ketone is polymethylvinyl ketone. However, the above are not limited thereto.

It is preferable to use a mixture of a chain carbonate and a cyclic carbonate. The cyclic carbonate and the chain carbonate are preferably mixed together in a volume ratio of 1:1 to 1:9. When the cyclic carbonate and the chain carbonate are mixed in the volume ratio of 1:1 to 1:9, and the mixture is used as an electrolyte, the electrolyte performance may be enhanced.

It is also preferable to use a mixture of an ethylene carbonate and a carbonate having a low boiling point. The carbonate having a low boiling point is preferably a carbonate having a boiling point of less than or equal to 150° C., more preferably less than or equal to 120° C. Examples of the carbonate having a low boiling point include dimethyl carbonate (DMC), diethyl carbonate (DEC), methylpropyl carbonate (MPC), ethyl propyl carbonate (EPC), methylethyl carbonate (MEC), propylene carbonate (PC), butylene carbonate (BC), and the like.

In addition, the electrolyte of the present invention may further include mixtures of carbonate solvents and aromatic hydrocarbon solvents of Formula (6):

wherein $R^3$ is a halogen or a $C_1$ to $C_{10}$ alkyl, and q is an integer of 1 to 6.

Examples of aromatic hydrocarbon solvents include benzene, chlorobenzene, nitrobenzene, fluorobenzene, toluene, trifluorotoluene, and xylene. The carbonate solvents and the aromatic hydrocarbon solvents are preferably mixed together in a volume ratio of 1:1 to 30:1. When a carbonate solvent and an aromatic hydrocarbon solvent are mixed with each other in the aforementioned volume ratio, and the mixture is used as an electrolyte, the electrolyte performance may be enhanced.

The electrolyte of the present invention is prepared by adding an additive comprising a) a sulfone-based compound; b) a $C_3$ to $C_{30}$ organic peroxide or azo-based compound; and selectively poly(ester)(meth)acrylate or a polymer thereof to a non-aqueous organic solvent including a lithium salt.

When a) a sulfone-based compound; b) a $C_3$ to $C_{30}$ organic peroxide or azo-based compound; and c) poly(ester)(meth)acrylate or a polymer thereof are used as an electrolyte additive, poly(ester)(meth)acrylate or a polymer thereof is polymerized to form a solid electrolyte. Hereinafter, the process for preparing a polymer electrolyte is explained in detail.

First, a) a sulfone-based compound; b) a $C_3$ to $C_{30}$ organic peroxide or azo-based compound; and c) poly(ester)(meth)acrylate or a polymer thereof are added to an organic solution containing a lithium salt to prepare a composition for a polymer electrolyte, and the composition is impregnated or coated on a current collector.

The impregnated or coated current collector is subjected to heat-treatment or UV radiation in order to carry out polymerization. A base catalyst may be added to the composition to facilitate a polymerization reaction. As the base catalyst, the base catalyst used in esterification of the (polyester)polyol can be used.

The heat-treatment temperature is determined by the half-life of a radical reaction of the initiator, and preferably ranges from 40° C. to 110° C., more preferably 60° C. to 85° C. When the temperature is too low, many unreacted monomers remain, and it takes too long to carry out the polymerization reaction. When the temperature is too high, it is not preferable since decomposition of the lithium salt increases.

The present invention provides a lithium battery comprising the electrolyte. The lithium battery of the present invention uses a material that is capable of reversible intercalation/deintercalation of the lithium ions (lithiated intercalation compound) or a material that is capable of reversibly forming a lithium-containing compound as a positive active material. The material that is capable of reversible intercalation/deintercalation of the lithium ions may include a lithium metal oxide such as $LiCoO_2$, $LiNiO_2$, $LiMnO_2$, $LiMn_2O_4$, $LiFeO_2$, $V_2O_5$, or $LiNi_{1-x-y}Co_xM_yO_2$ (where $0 \leq x \leq 1$, $0 \leq y \leq 1$, $0 \leq x+y \leq 1$, and M is a metal such as Al, Sr, Mg, or La) or a lithium calcogenide compound. A lithium-nickel-manganese-based metal oxide of the lithium metal oxide has good electrochemical properties but poor safety, especially in terms of swelling inhibition. However, the electrolyte of the present invention can solve the problem of swelling.

The lithium battery of the present invention uses a lithium metal, a lithium-containing alloy, or a carbonaceous material that is capable of reversible intercalation/deintercalation of the lithium ions. The lithium-containing alloy may be selected from alloys of lithium and a metal selected from Al, Si, Sn, Pb, Zn, Bi, In, Mg, Ga, or Cd. The carbonaceous material may be selected from crystalline and amorphous carbon, graphitized carbon fiber, graphitized mesocarbonmicrobead (MCMB), and carbon composite materials. It is preferable that the carbonaceous material has a $d_{002}$ interplanar distance of 3.35~3.38 Å, an Lc (crystallite size) measured by X-ray diffraction of more than 20 nm, an exothermic peak of at least 700° C. and I(1360)/I(1580) ratio of 0.01-1.5 in Raman peak value.

A lithium secondary battery is prepared by the following process: a sulfone-based compound and a $C_3$ to $C_{30}$ organic peroxide or azo-based compound are added to a lithium salt-containing organic solution to prepare a composition for an electrolyte; a separator and an insulating resin with a network structure are interposed between a negative electrode and a positive electrode that are fabricated by a conventional process, and the whole assembly is wound or stacked to fabricate an electrode assembly; then the electrode assembly is inserted into a battery case followed by sealing. The separator may be a polyethylene or polypropylene monolayered separator, a polyethylene/polypropylene double layered separator, a polyethylene/polypropylene/polyethylene three layered separator, or a polypropylene/polyethylene/polypropylene three layered separator. A cross-sectional structure of the lithium battery prepared by the above process is shown in FIG. 1.

When the poly(ester)(meth)acrylate or polymer thereof is further added to a composition for forming an electrolyte, it is preferable that the fabricated battery is subjected to heat-treatment or UV radiation to prepare a gel polymer by inducing polymerization. The heat-treatment is preferably carried out at the temperature of 40° C. to 110° C., more preferably 60° C. to 85° C.

Alternatively, a solid polymer electrolyte battery is prepared by the following process: a sulfone-based compound; a $C_3$ to $C_{30}$ organic peroxide or azo-based compound and a poly(ester)(meth)acrylate or a polymer thereof are added to a lithium salt-containing organic solution to prepare a composition for a polymer electrolyte; the composition is coated on a current collector; heat-treatment or UV radiation is carried out to perform polymerization; the polymerized polymer electrolyte is peeled off from the current collector to obtain a polymer electrolyte with a film shape (where the film thickness is preferably 5 to 90 μm, a thickness range where ionic conductivity of the polymer electrolyte is improved); the polymer electrolyte film is interposed between a negative electrode and a positive electrode that are fabricated by a conventional process to fabricate an electrode assembly; and the electrode assembly is inserted into a battery case followed by sealing. A separator and an insulating resin with a network structure may be interposed between the negative electrode and the positive electrode.

The electrolyte of the present invention can be applied to all types of lithium batteries, including a lithium primary battery and a lithium secondary battery. The lithium secondary battery can realize effective electrochemical properties, particularly cycle life characteristics at high temperature, as well as inhibition of swelling from gas generation and safety properties such as overcharge properties, compared with conventional non-aqueous electrolytes.

The following examples further illustrate the present invention in detail, but are not to be construed to limit the scope thereof.

EXAMPLE 1

Ethylene carbonate (EC)/ethyl methyl carbonate (EMC)/diethyl carbonate (DEC) were mixed in a volume ratio of 30/60/10 in order to prepare an organic mixed solvent. 1.15 M $LiPF_6$ were added to the solvent, and an electrolyte additive including 0.75 wt % of vinyl sulfone and 0.0033 wt % of dilauroyl peroxide, based on the total weight of the electrolyte, were further added to the solution to prepare a composition to form an electrolyte.

$LiNi_{0.7}Co_{0.1}Mn_{0.2}O_2$ as a positive active material, Super P (acetylene black) as a conductive agent, and polyvinylidene-fluoride (PVdF, Solef 6020, Solvey company) as a binder were mixed in a weight ratio of 96:2:2 in N-methyl-2-pyrrolidone (NMP) to prepare a positive slurry. The slurry was coated on an aluminum foil, dried, and compressed by a roll press, thus providing a positive electrode having an active mass density of 3.5 g/cm³. Graphite as a negative active material and PVdF (Solef 6020, Solvey company) as a binder were mixed in a weight ratio of 95:5 to prepare a negative slurry. The slurry was coated on a copper foil, dried, and compressed by a roll press, thus providing a negative electrode having an active mass density of 1.6 g/cm³. The positive and negative electrodes were cut to an appropriate size, and a polyethylene porous film separator was interposed therebetween, followed by winding to fabricate an electrode assembly. The electrode assembly was placed into a pouch case, and edges of the pouch except a portion for injecting the electrolyte were fused. 2.5 g of the electrolyte prepared as above were injected into the pouch case, and the portion for injecting electrolyte was fused, thus completing the fabrication of the 700 mAh pouch-type battery cell.

EXAMPLE 2

A battery cell was prepared in the same manner as in Example 1, except that ethylene carbonate (EC)/ethyl methyl carbonate (EMC)/propylene carbonate (PC)/fluorobenzene (FB) were mixed in a volume ratio of 30/55/5/10 in order to prepare an organic mixed solvent.

EXAMPLE 3

Ethylene carbonate (EC)/ethyl methyl carbonate (EMC)/diethyl carbonate (DEC) were mixed in a volume ratio of 30/60/10 in order to prepare an organic mixed solvent. 1.15 M $LiPF_6$ were added to the solvent, and an electrolyte additive including 0.75 wt % of vinyl sulfone, 0.0033 wt % of dilauroyl peroxide, and 3 wt % of a polyester hexaacrylate compound, based on the total weight of the electrolyte, were further added to the solution to prepare a composition to form an electrolyte.

The polyester hexaacrylate compound was synthesized as follows: 1 mole of dipentaerythritol and 2 moles of ε-caprolactone were added to a toluene solvent, a tetrapropyltitanate catalyst was added in an amount of 0.01 wt %, and then reaction was carried out at 50° C. to synthesize a dipentaerythritol monomer wherein a portion of hydroxyl groups was substituted with ε-caprolactone. 1 mole of the dipentaerythritol monomer, 4 moles of acrylic acid, and 2 moles of butylcarbonic acid were reacted to obtain the polyester hexaacrylate compound where four hydroxyl (—OH) groups of the monomer were substituted with —OC(=O)(CH$_2$)$_5$OC(=O)CH=CH$_2$ and two hydroxyl (—OH) groups were substituted with —OC(=O)(CH$_2$)$_3$CH$_3$.

A battery cell was prepared in the same manner as in Example 1, except that 2.5 g of the electrolyte prepared as above were injected into the pouch case, and the portion for injecting electrolyte was fused, thus completing the fabrication of the 700 mAh pouch-type battery cell.

EXAMPLE 4

A battery cell was prepared in the same manner as in Example 3, except that ethylene carbonate (EC)/ethyl methyl carbonate (EMC)/propylene carbonate (PC)/fluorobenzene (FB) were mixed in a volume ratio of 30/55/5/10 in order to prepare an organic mixed solvent.

EXAMPLE 5

A battery cell was prepared in the same manner as in Example 3, except that the battery cell prepared in Example 3 was heat-treated at 78° C. for four hours in order to polymerize the polyester of the hexaacrylate compound thermally.

EXAMPLE 6

A battery cell was prepared in the same manner as in Example 1, except that benzoyl peroxidewas used instead of dilauroyl peroxide.

EXAMPLE 7

A battery cell was prepared in the same manner as in Example 1, except that 2,2'-azoisobutyronitrile (AIBN) was used instead of dilauroyl peroxide.

COMPARATIVE EXAMPLE 1

A battery cell was prepared in the same manner as in Example 1, except that 1.15 M $LiPF_6$ were added to a mixed solvent of ethylene carbonate (EC)/ethyl methyl carbonate (EMC)/diethyl carbonate (DEC) in a volume ratio of 30/60/10 to prepare a composition to form an electrolyte.

COMPARATIVE EXAMPLE 2

A battery cell was prepared in the same manner as in Example 1, except that 1.15 M $LiPF_6$ were added to a mixed solvent of ethylene carbonate (EC)/ethyl methyl carbonate (EMC)/propylene carbonate (PC)/fluorobenzene (FB) in a volume ratio of 30/55/5/10 to prepare a composition to form an electrolyte.

COMPARATIVE EXAMPLE 3

A battery cell was prepared in the same manner as in Example 1, except that 1.15 M $LiPF_6$ and an electrolyte additive including 0.75 wt % of vinyl sulfone based on the total weight of electrolyte were added to a mixed solvent of ethylene carbonate (EC)/ethyl methyl carbonate (EMC)/diethyl carbonate (DEC) in a volume ratio of 30/60/10 to prepare a composition to form an electrolyte.

COMPARATIVE EXAMPLE 4

A battery cell was prepared in the same manner as in Example 1, except that 1.15 M $LiPF_6$ and an electrolyte additive including 0.01 wt % of dilauroyl peroxide based on the total weight of electrolyte were added to a mixed solvent of ethylene carbonate (EC)/ethyl methyl carbonate (EMC)/diethyl carbonate (DEC) in a volume ratio of 30/60/10 to prepare a composition to form an electrolyte.

The pouch cells of the Examples and Comparative Examples were placed for aging for three days and charged and discharged once at 0.2 C for formation of the batteries. The batteries were charged at 1 C to a cut-off voltage of 4.2 V under constant current and constant voltage (CC-CV), and then discharged at 0.2 C to a cut-off voltage of 2.75 V under constant current (CC) for standard charge-discharge. Thereafter, the batteries were charged and discharged for 300 cycles at 1.0C in the voltage range of 4.2 to 2.75V in order to evaluate cycle life characteristics. The results are shown in Table 1.

TABLE 1

| | Capacity retention (capacity at $300^{th}$ cycle/ capacity at $1^{st}$ cycle) |
|---|---|
| Example 1 | 96.2% |
| Example 2 | 95.4% |
| Example 3 | 95.1% |
| Example 4 | 96.4% |
| Example 6 | 96.5% |
| Example 7 | 96.1% |
| Comparative Example 1 | 87.1% |
| Comparative Example 2 | 86.2% |
| Comparative Example 3 | 86.0% |
| Comparative Example 4 | 83.2% |

As shown in Table 1, the cycle lives of Examples 1 to 7 were better than those of the Comparative Examples 1 to 4.

After the batteries were placed at 85° C. for 4 hours, the thickness of each cell was measured in order to determine swelling inhibition properties at high temperatures. The results are shown in Table 2. The test results are average values for 5 cells.

TABLE 2

| | Thickness of batteries after standard charge (mm) | Thickness of batteries after storage of 85° C. or 4 hours 85° C. (mm) | Thickness increment ratio (%) |
|---|---|---|---|
| Example 1 | 3.40 | 3.43 | 0.88 |
| Example 2 | 3.42 | 3.49 | 2.05 |
| Example 3 | 3.56 | 3.60 | 1.12 |
| Example 4 | 3.54 | 3.59 | 1.41 |

TABLE 2-continued

| | Thickness of batteries after standard charge (mm) | Thickness of batteries after storage of 85° C. or 4 hours 85° C. (mm) | Thickness increment ratio (%) |
|---|---|---|---|
| Example 6 | 3.42 | 3.48 | 1.75 |
| Example 7 | 3.50 | 3.55 | 1.43 |
| Comparative Example 1 | 3.50 | 12.05 | 244.29 |
| Comparative Example 2 | 3.52 | 12.43 | 253.13 |
| Comparative Example 3 | 3.56 | 9.25 | 159.83 |
| Comparative Example 4 | 3.54 | 10.58 | 198.87 |

*Thickness increment ratio: ((Thickness of batteries after storage of 85° C. − Thickness of batteries after standard charge)/Thickness of batteries after standard charge) × 100

As shown in Table 2, the swelling inhibition properties of the cells of Examples 1 to 7 were significantly improved over those of Comparative Examples 1 to 4.

Figure 2:
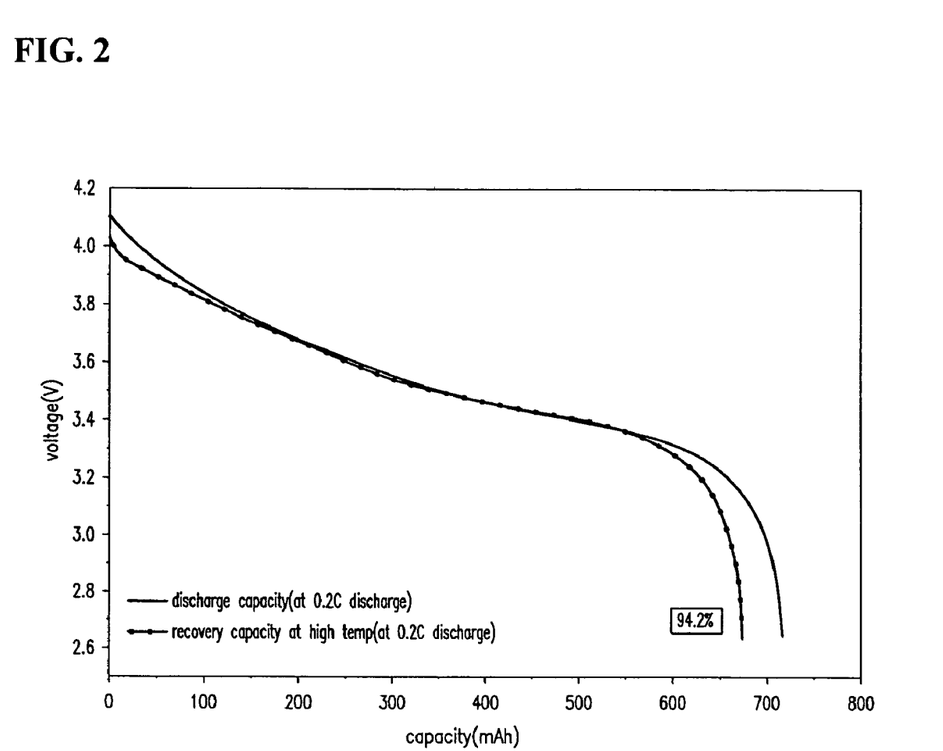
FIG. 2 is a graph illustrating cycle life characteristics of the battery cell according to Example 1.

The cell of Example 1 was discharged at 0.2C at high temperature in the voltage range of 4.2 to 2.75V to measure recovery capacity. The results are shown in FIG. 2. As shown in FIG. 2, the recovery capacity ratio at high temperatures is a good ratio of 94.2%.

The lithium battery comprising the electrolyte of the present invention has significantly improved charge-discharge and cycle life characteristics, recovery capacity ratio at high temperature, and swelling inhibition properties than those comprising conventional non-aqueous electrolytes.

While the present invention has been described in detail with reference to the preferred embodiments, those skilled in the art will appreciate that various modifications and substitutions can be made thereto without departing from the spirit and scope of the present invention as set forth in the appended claims.

The invention claimed is:

1. An electrolyte for a lithium battery comprising a non-aqueous organic solvent, a lithium salt, and an additive comprising the polymerization reaction product of:

a) a sulfone-based compound represented by Formula (1):

(1)

where $R^1$ and $R^2$ are independently selected from the group consisting of primary alkyl groups, secondary alkyl groups, tertiary alkyl groups, alkenyl groups, and aryl groups;

b) a $C_3$ to $C_{30}$ organic peroxide or azo-based compound; and c) a poly(ester)(meth)acrylate or a polymer thereof wherein the poly(ester)(meth)acrylate is a polymer derived from a (polyester)polyol with at least three hydroxyl (—OH) groups, where a portion or all of the hydroxyl groups are substituted with a (meth)acrylic ester and any remaining hydroxyl groups that are not substituted with the (meth)acrylic ester are substituted with a group having no radical reactivity.

2. The electrolyte for a lithium battery according to claim 1, wherein the organic peroxide or azo-based compound is present in an amount of 0.001 to 10 wt % based on the total amount of electrolyte.

3. The electrolyte for a lithium battery according to claim 1, wherein the organic peroxide is selected from the group consisting of isobutyl peroxide, lauroyl peroxide, benzoyl peroxide, m-toluoyl peroxide, t-butylperoxy-2-ethyl hexanoate, t-butyl peroxy bibarate, t-butyloxyneodecanate, diisopropyl peroxy dicarbonate, diethoxy peroxy dicarbonate, bis-(4-t-butylcyclohexyl)peroxy dicarbonate, dimethoxy isopropyl peroxy dicarbonate, dicyclohexylperoxy dicarbonate, 3,3,5-trimethylhexanoyl peroxide, and dialkyl oxide.

4. The electrolyte for a lithium battery according to claim 1, wherein the azo-based compound comprises 2,2'-azobisisobutyronitrile.

5. The electrolyte for a lithium battery according to claim 1, wherein the lithium salt is at least one selected from the group consisting of $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiSbF_6$, $LiAlO_4$, $LiAlCl_4$, $LiN(C_xF_{2x+1}SO_2)(C_yF_{2y+1}SO_2)$, wherein x and y are natural numbers, LiCl, and LiI.

6. The electrolyte for a lithium battery according to claim 5, wherein the lithium salt is present in a concentration ranging from 0.6 to 2.0 M.

7. The electrolyte for a lithium battery according to claim 1, wherein the non-aqueous organic solvent is at least one selected from the group consisting of carbonates, esters, ethers, and ketones.

8. The electrolyte for a lithium battery according to claim 7, wherein the non-aqueous organic solvent comprises at least one carbonate selected from the group consisting of dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), and butylene carbonate (BC).

9. The electrolyte for a lithium battery according to claim 1, wherein the electrolyte comprises a mixed solvent of a cyclic carbonate and a chain carbonate.

10. The electrolyte for a lithium battery according to claim 1, wherein the electrolyte comprises a mixed solvent of a carbonate solvent and an aromatic hydrocarbon solvent.

11. The electrolyte for a lithium battery according to claim 10, wherein the aromatic hydrocarbon solvent is a compound of Formula (6):

wherein $R^3$ is a halogen or a $C_1$ to $C_{10}$ alkyl, and q is an integer of 1 to 6.

12. The electrolyte for a lithium battery according to claim 11, wherein the aromatic hydrocarbon solvent is at least one selected from the group consisting of benzene, chlorobenzene, nitrobenzene, fluorobenzene, toluene, trifluorotoluene, and xylene.

13. The electrolyte for a lithium battery according to claim 10, wherein the carbonate solvent and the aromatic hydrocarbon solvent are mixed in a volume ratio of 1:1 to 30:1.

14. The electrolyte for a lithium battery according to claim 10, wherein the electrolyte comprises a mixed solvent of an ethylene carbonate and a carbonate having a lower boiling point.

15. A lithium battery comprising:
  a positive electrode including a material that is capable of reversible intercalation/deintercalation of lithium ions, or a material that is capable of reversibly forming a lithium-containing compound as a positive active material;
  a negative electrode including a lithium metal, a lithium-containing alloy, or a material that is capable of reversible intercalation/deintercalation of lithium ions; and
  an electrolyte of claim 1.

* * * * *